Dec. 16, 1952 W. K. ROBBINS 2,621,470
CONNECTING LINK FOR CHAINS AND THE LIKE
Filed Sept. 1, 1950 2 SHEETS—SHEET 1
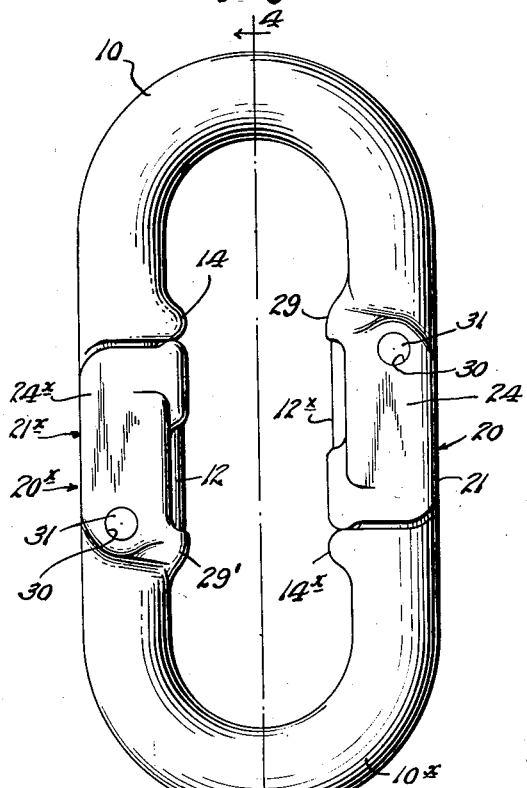
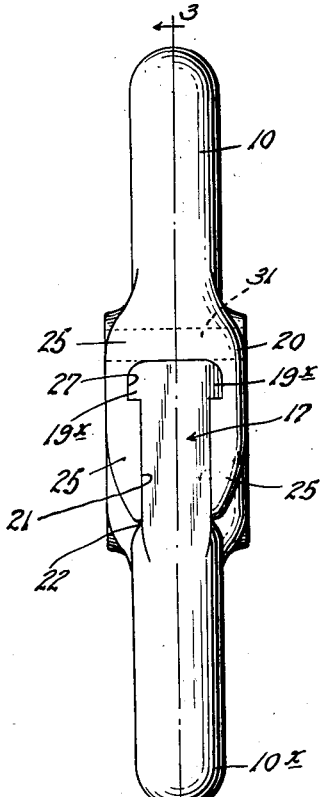
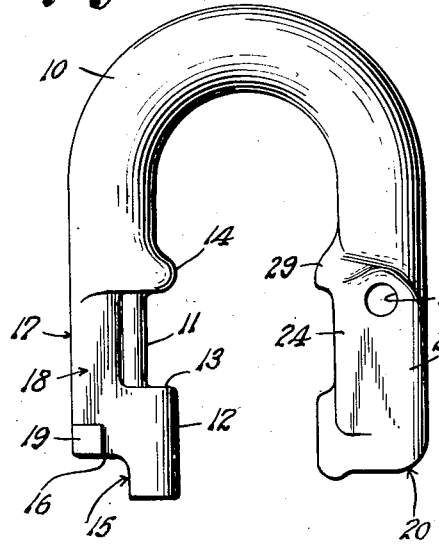
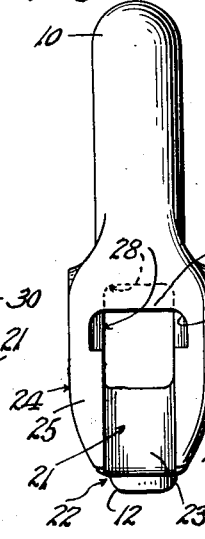
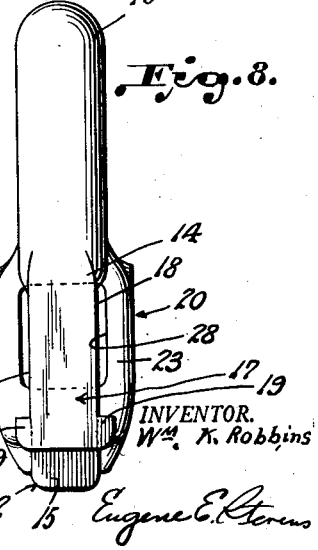
INVENTOR.
Wm. K. Robbins
BY Eugene E. Stevens
ATTORNEY.

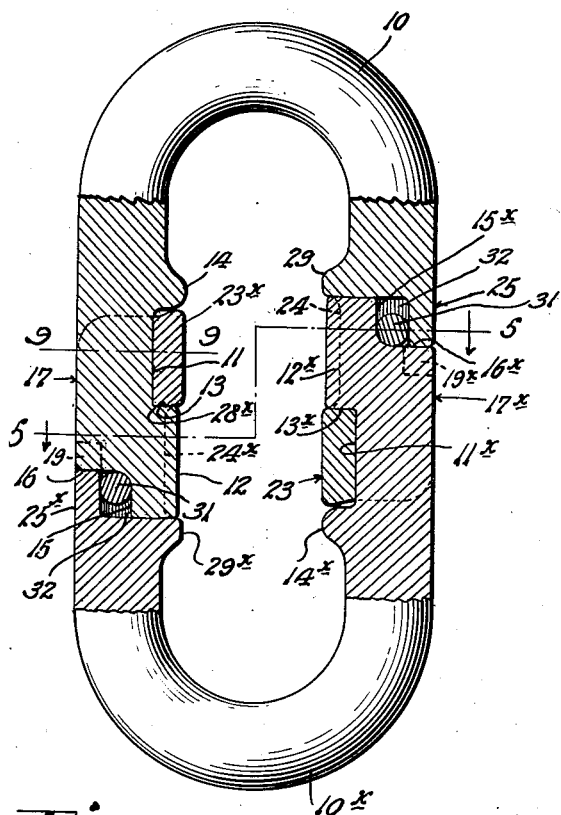

Patented Dec. 16, 1952

2,621,470

UNITED STATES PATENT OFFICE 2,621,470

CONNECTING LINK FOR CHAINS AND THE LIKE

William Kalleen Robbins, Milwaukee, Wis.

Application September 1, 1950, Serial No. 182,780

11 Claims. (Cl. 59—85)

1

My invention relates to repair or connecting links for chains and the like and is an improvement over the disclosures contained in my copending application Serial No. 50,485, filed September 20, 1948.

Aside from its use as a replacement for a broken chain link, my instant development is especially suitable for making connections to drag line buckets and the like. It is particularly adapted for both of the uses noted, and others, by reason of the fact that it can be assembled and taken apart much quicker than any other separable section link that is available at the present time and such operations require no tools beyond a hammer and a punch element, both of which are always available in the field.

Additionally, the invention contemplates a link for the purposes specified wherein pins may be employed for retaining the link sections in assembly and are protected against destruction by shearing action under pulling loads applied to the chain or other connection of which the link is a part.

Another object of the invention is to provide a link as characterized which is simple in construction, comparatively inexpensive to manufacture in quantity, and which is so formed as to substantially eliminate eccentric bending of the link sections under pulling loads, while still admitting of a use of one or more simple locking elements such as a groove pin, rivet or bolt.

The invention also resides in certain detailed features of construction, combination and arrangement of the various parts and in modes of operation, all of which will be readily understood and appreciated by those skilled in the art upon reference to the accompanying drawings which illustrate a now preferred example of my inventive concept.

It is to be understood, however, that various modifications in and departures from the device as illustrated may be made within the scope of the subject matter as claimed hereinafter.

In the drawings, wherein the same reference characters have been used to designate the same parts throughout the several views—

Fig. 1 is a plan view of the assembled link;

Fig. 2 is a side elevational view taken from the right of the Fig. 1 showing;

Fig. 3 is a view similar to Fig. 1 but with the joint forming parts broken and shown in section, the sectional illustration having been taken on the line 3—3 of Fig. 2;

Fig. 4 is a sectional view taken on the line 4—4 of Fig. 1;

2

Fig. 5 is a cross sectional view taken on the line 5—5 of Fig. 3;

Fig. 6 is a plan view of one of the link sections;

Fig. 7 is a side elevational view of the socket-providing side of the link section shown in Fig. 6;

Fig. 8 is a side elevational view of the stud-providing side of said link section;

Fig. 9 is a detailed cross sectional view taken on the line 9—9 of Fig. 3; and

Fig. 10 is a fragmentary longitudinal sectional view of one side of the link of Fig. 3 and illustrating the link sections in partially assembled relationship.

As illustrated in the drawings, my novel link comprises duplicate, substantially U-shaped sections which are indicated in the drawings by reference characters 10, 10x, respectively. The link sections 10, 10x being duplicates, a detailed description of one will suffice for both.

Turning to Figs. 6, 7 and 8, the link section 10 is illustrated in detail and one arm of same has its inner surface cut away adjacent its outer end to provide the transversely convex seat 11 and the adjacent inwardly projecting terminal stud 12. The outer end of the seat 11 terminates in a shoulder 13, while the section 10 provides an inwardly projecting cam portion 14 at the inner end of said seat 11.

The back and sides of the stud-carrying arm of the link section 10 are flattened inwardly of the plane of cam portion 14 as indicated by reference characters 17, 18, respectively.

As shown in Figs. 3, 6 and 10, the back portion of the stud 12 is cut away inwardly from its outer end to provide the stud with an end extension 15 of reduced thickness and which terminates in the transverse shoulder 16. A laterally projecting lug 19 extends from each flattened side 18 of the stud end of the link 10 at the junction of shoulder 16 and the flattened back surface 18, as indicated in Figs. 6, 8 and 10.

Turning now to the other arm of the link section 10, it is seen to terminate in a box-like socket-providing portion which is generally designated by reference character 20. It is to be noted that the stud 12 of the other arm projects somewhat beyond the plane of the socket-providing portion 20, as indicated in Figs. 6, 7 and 8. Socket portion 20 is adapted to receive the stud 12x and adjacent portion of the companion link section 10x as will be described hereinafter.

Still referring to Figs. 6, 7 and 8, the socket-providing end 20 of the link section 10 is seen to provide a socket 21 which is open at its outer end as indicated at 22. The socket 21 has the side walls 24, the outer bridge wall 25 and the inner bridge-providing wall 23 which seats and sustains the stud arm of the other link section 10x as will be explained hereinafter (see Fig. 3).

Fig. 7 discloses the outer socket bridge wall 25 as having the opposed recesses 27 providing what might be defined as the T-head end of the slot-like socket space 21 between side walls 24 and which are adapted to receive the side lugs 19x of the stud end 12x of the companion link 10x (see Fig. 2).

Figs. 3, 7 and 8 disclose the inner bridge wall 23 of the socket-providing end 20 of link 10 as having a rectangular hole 28 at the inner end of said socket 21 to snugly accommodate the stud 12x of the companion link 10x, whose seat portion 11x then receives the bridge portion 23 of the first-mentioned link section 10 (see Fig. 3).

Figs. 3 and 6 show the inner end of the socket portion 20 as having an inwardly projecting thickened cam-providing portion 29 which tends to deflect an adjacent link of a chain (not shown) away from the bridging wall portion 23 when the chain is slack.

The socket-providing portion 20 also has aligned holes 30 extending through its side walls 24 for the reception of a standard groove pin 31 or some other conventional fastener such as a rivet, bolt or the like, for holding the link sections 10, 11 assembled.

Corresponding portions of the companion link 10x are marked, as earlier mentioned herein, with the same reference characters employed in connection with the link section 10 except that the suffix "x" has been added. For instance, the inwardly projecting stud of the link section 10x is indicated by reference character 12x, the socket-providing end by reference character 20x, etc.

Turning to Figs. 3 and 10, the link sections 10, 10x are assembled in the following manner:

The studs 12, 12x are disposed in the respective sockets 21, 21x with the inner surfaces of said studs slidably resting upon the inner bridge walls 23x, 23 of said sockets. In this partially assembled relationship of the parts the inner surfaces of the pairs of side lugs 19, 19x of the stud-providing arms of the sections ride upon the outer surfaces of the respective outer walls 24x, 24 at opposite sides of the respective sockets 21, 21x. Now the parts are slid inwardly until the studs 12, 12x drop into the inner bridge wall holes 28x, 28, at which time the laterally projecting lugs 19, 19x will drop into the respective T-enlargements 27x, 27 of the companion link member.

Fig. 3 illustrates the space 32 which exists between the surfaces 15, 25x and 15x, 25 for the reception of the pins 31. The bearing of the pins 31 against the inner surface of wall 25x and the outer surface 15 of the reduced end of the lug 12 prevents separation of the links. Also, as indicated in Fig. 3, the inner surface of the outer socket wall 25x is in substantial bearing contact with pin 31. Thus, when the link is under lineal load the pin 31 is in "compression" so as to speak, between the reduced stud portion 15 and the inner surface of wall 25x and is not subjected to destructive shearing action.

Furthermore, the reduced stud portion 15 acting through pins 31 serves to resist eccentric bending of the companion link section 10x.

Referring to Figs. 2 and 3, it will be noted that the lineal pulling load on the link 10, 10x in service is sustained by two different sets of interengaging link section elements. For instance, turning to Fig. 3, it will be appreciated that such lineal pulling load is in part sustained by the interengagement of stud shoulders 13, 13x with the contiguous ends of the respective inner wall-provided bridge elements 23x, 23 of the socket portions 21x, 21 of the companion link section.

Now as to the second set of interengaging lineal load-sustaining link section portions, it will be understood from an inspection of Figs. 3, 7 and 8, that when the aligned outwardly projecting side lugs 19, 19 and 19x, at the outer edges of stud members 12, 12x are engaged in the respective T-head enlargements 27, 27x of the outer socket walls they will function for the purpose stated.

Aside from their stated lineal load sustaining function the inner bridge walls 23, 23x of socket portion 21, 21x also serve in two ways to resist inward eccentric bending of the companion link section. First, as indicated in Fig. 3, the bridge member 23x through engagement in the seat 11 of link section 10 inwardly of stud 12 serves to prevent inward swinging of the stud-carrying arm of link section 10 and consequent eccentric bending of said section. Secondly, the outer edge of said bridge wall 23x (the upper edge as viewed in Fig. 3) engages the adjacent wall of cam 14 to prevent relative inward lineal movement of the stud-carrying arm of said link section 10, and in this way to resist eccentric bending as its bight portion.

Fig. 3 also shows that the inner end of the stud-receiving socket 21x of link section 10x engages the outer end of stud 12 of the other link section 10 as a further means to prevent relative inward lineal movement and incident eccentric bending at the bight portion of link section 10 under heavy lineal loads. Functioning similarly (Fig. 3) is outer socket wall 25x at the inner end of slot 26x, 27x engaging stud shoulder 16 of the companion link section 10. (See also 25, 26, 27 in Fig. 2.)

Thus, by employing the pins 31 and the lugs 19, 19x, the link of my development will sustain the same load as a solid link of the same size, say one inch, high test carbon chain. The lugs seating in their recesses 27, 27x (see Fig. 2) operate to prevent inward eccentric movement of the stud portions 12, 12x as the case may be; and also the pins 31 engaging the shoulders 16 function to the same end.

That portion of the outer socket wall 25x (see Fig. 3) which overlies pin 31 and the reduced stud portion 15, aside from the several functions heretofore ascribed to it, serves to strengthen the socket side walls 24 in the region of the drilled pin-receiving holes 30. In this connection, it is to be noted that the outer socket wall portion 25x in question is of a section to more than compensate to any weakening of the side by reason of pin holes 30.

From the foregoing description considered in connection with the accompanying drawings, it is believed that my improvements will be readily understood and appreciated by those skilled in the art.

Having thus described my invention what I claim is:

1. A separable section connecting link for chains and the like comprising in combination a pair of duplicate substantially U-shaped sections, an inwardly extending stud at the end of one arm of each section and a socket at the outer end of the other arm, said socket having spaced parallel walls and being closed at its inner end and open at its free end and outer side, inner and outer bridge walls which are shorter than the length of said socket and connecting said parallel walls adjacent the outer and inner socket ends, respectively, the inner bridge wall cooperating with said spaced parallel walls and with the inner end of said socket to provide a stud-receiving recess for the stud of the other U-shaped section, the back of each stud being cut away to provide a tongue at its outer end and a shoulder at the inner end of said tongue, said tongue adapted to spacedly underlie said outer bridge wall, a pin extending through said parallel walls and the space between said outer bridge wall and stud tongue extension, and the outer tongue end of said stud and said tongue shoulder having bearing engagement with the inner end of said socket and the outer end of said outer bridge wall, respectively.

2. The combination set forth in claim 1, and the stud end of each section having laterally projecting lugs at opposite sides, and the outer bridge wall having recesses receiving said lugs.

3. The combination set forth in claim 1, and each stud-carrying arm being cut away at its inner surface inwardly of said stud to provide a seat for said inner bridge wall.

4. The combination set forth in claim 1, and each stud-carrying arm being cut away at its inner surface inwardly of said stud to provide a seat for said inner bridge wall, and said arm providing an inwardly projecting cam at the end of said seat remote from said stud.

5. The combination set forth in claim 1, and each stud-carrying arm being cut away at its inner surface inwardly of said stud to provide a seat for said inner bridge wall, said arm providing an inwardly projecting cam at the end of said seat remote from said stud, and each socket-bearing arm providing an inwardly extending cam surface at the inner end of said socket.

6. The combination set forth in claim 1, and the stud end of each section having laterally projecting lugs at opposite sides, the outer bridge wall having recesses receiving said lugs, and each stud-carrying arm being cut away at its inner surface inwardly of said stud to provide a seat for said inner bridge wall.

7. The combination set forth in claim 1, and the stud end of each section having laterally projecting lugs at opposite sides, the outer bridge wall having recesses receiving said lugs, and each stud-carrying arm being cut away at its inner surface inwardly of said stud to provide a seat for said inner bridge wall, and said arm providing an inwardly projecting cam at the end of said seat remote from said stud.

8. The combination set forth in claim 1, and the stud end of each section having laterally projecting lugs at opposite sides, the outer bridge wall having recesses receiving said lugs, and each stud-carrying arm being cut away at its inner surface inwardly of said stud to provide a seat for said inner bridge wall, said arm providing an inwardly projecting cam at the end of said seat remote from said stud, and each socket-carrying arm providing an inwardly extending cam surface at the inner end of said socket.

9. A repair link or the like for chains comprising generally U-shaped sections, one arm of each section having an inwardly projecting stud, the other arm of each section having an outwardly opening socket having two laterally spaced walls, said socket being also open at its outer end, and formed to snugly receive the stud and adjacent arm portion of the other link section, the back of the outer end of each stud being cut away to provide a tongue extension of reduced thickness and a shoulder at the inner end of said tongue extension, an inner bridge member connecting said spaced socket walls adjacent their inner edges and at the outer end of the socket, said inner bridge member cooperating with said spaced walls and the inner end of said socket to provide a stud receiving recess, an outer bridge member connecting said spaced socket walls adjacent their outer edges at the inner end of said socket, said outer bridge member overlying said stud tongue, and a pin extending through said socket sides between said stud tongue and the inner surface of said outer bridge member.

10. The combination set forth in claim 9, and the outer end of the stud-carrying arm of each section having laterally projecting lugs at opposite sides, and the outer bridge member having recesses receiving said lugs.

11. A separable section link comprising generally U-shaped laterally interfitting sections, an inwardly extending stud carried by one arm of each section, a laterally opening socket carried by the other arm of each section, and adapted to receive the stud and adjacent arm portion of the other section, lineally spaced shoulders provided by each socket and arranged to contiguously engage opposite ends of the stud of the other section, pin means carried by each socket and bearing against the outer surface of the stud member of the other section, and a bridge member carried by said socket outwardly of said pin means and engaging the same, the outer end of the stud-carrying arm of each section having lugs projecting from opposite sides, and said bridge member having recesses receiving said lugs.

WILLIAM KALLEEN ROBBINS.

REFERENCES CITED

The following references are of record in the file of this patent:

UNITED STATES PATENTS

| Number | Name | Date |
| --- | --- | --- |
| 736,371 | Egbert | Aug. 18, 1903 |
| 2,357,768 | Robbins | Sept. 5, 1944 |
| 2,385,232 | Robbins | Sept. 18, 1945 |